Patented June 11, 1946

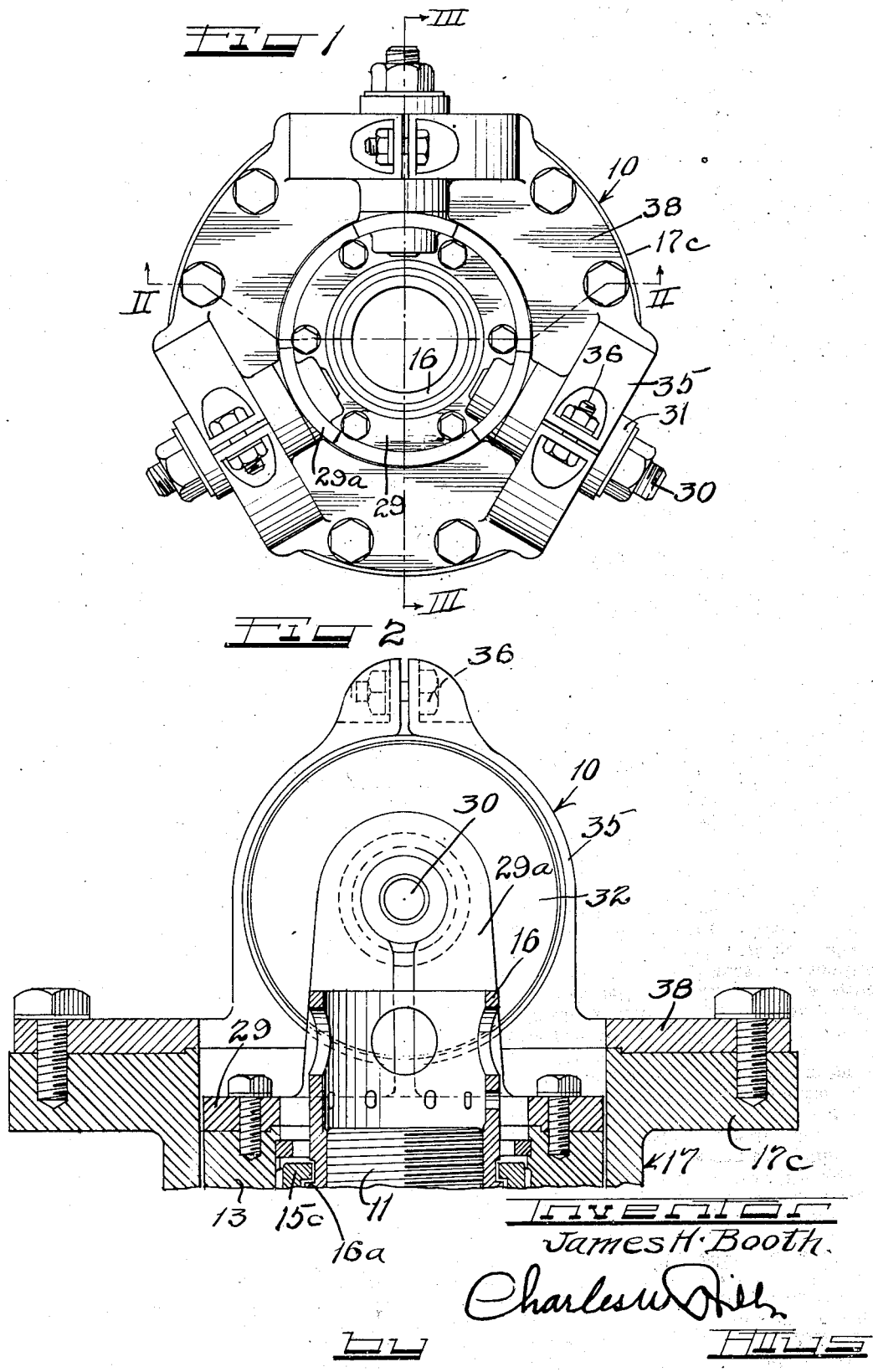

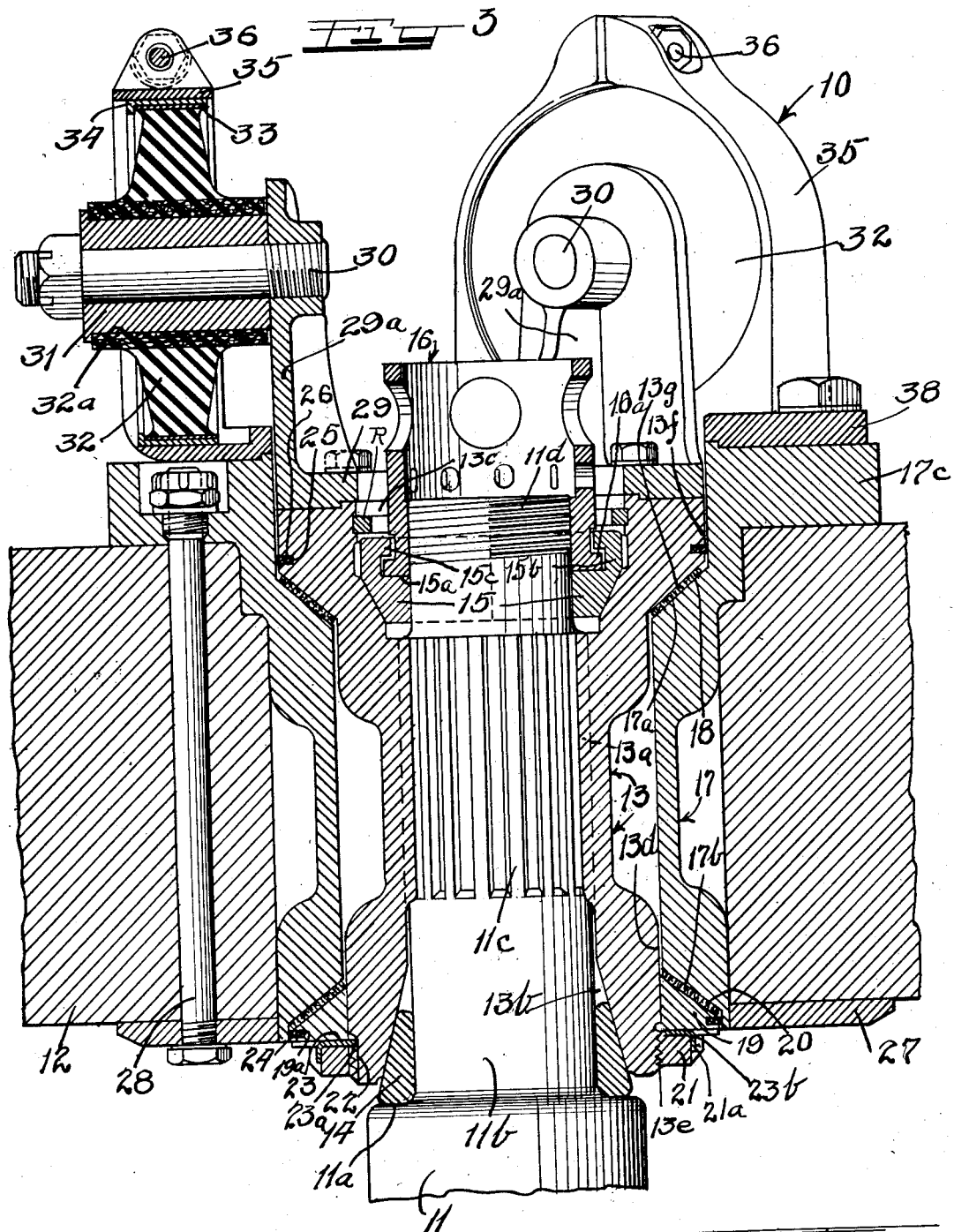

2,401,812

UNITED STATES PATENT OFFICE 2,401,812

PROPELLER JOINT

James H. Booth, Detroit, Mich., assignor to Thompson Products, Inc., Cleveland, Ohio, a corporation of Ohio Application June 12, 1943, Serial No. 490,619

5 Claims. (Cl. 170—177)

This invention relates to joint or coupling constructions for transmitting torsion load.

Specifically the invention relates to devices for coupling a drive shaft with a propeller hub or air screw adapted to dampen out vibrations.

While the invention will hereinafter be specifically described as embodied in a device for coupling an airplane engine drive shaft with a propeller, it should be understood that the invention is not limited to such usage, being generally applicable to joints or couplings between driving and driven members.

According to this invention the splined end of an aircraft engine drive shaft receives, in splined relation thereon, a sleeve having recessed end faces in which are seated wedge rings. One of the wedge rings is bottomed on a shoulder of the engine shaft while the other wedge ring is acted on by a nut threaded on the shaft to hold the sleeve in fixed position on the shaft. A propeller hub-receiving member is disposed around the sleeve and has thrust faces coacting with external faces on the sleeve to clamp the device on the sleeve. Driving torque is transmitted from the sleeve to the propeller hub-mounting device through a rubber-bushed coupling. This coupling is composed of a ring mounted on an end face of the sleeve having legs or flanges carrying radially extending pins on which are seated trunnion blocks disposed in rubber bushings. The rubber bushings are carried in housings provided on a ring secured to the hub-receiving member.

Driving torque is thus transmitted from the engine drive shaft through the sleeve to the coupling ring carried by the sleeve, thence through the pins and trunnion blocks to the rubber bushings and through the rubber bushings to the housings in which they are seated, and through the rings carrying the housings to the propeller hub-receiving member.

The rubber bushings are disposed symmetrically around an end of the hub-receiving member and have exposed faces so that the rubber can be deformed for accommodating relative movements between the engine shaft and propeller. However, while such relative movement is permitted, it can occur only through interparticle flow of the rubber and, as a result, vibrations set up by either the propeller or the engine drive shaft are effectively absorbed and dampened. The devices of this invention therefore prevent the building up of harmonic vibrations between driving and driven parts.

It is, then, an object of this invention to provide a propeller joint or coupling for connecting an engine shaft with a propeller or air screw.

A further object of the invention is to provide a rubber-bushed coupling in a propeller mounting.

A still further object of the invention is to provide a device for connecting driving and driven members adapted to absorb and dampen vibrations of the members.

A still further object of the invention is to provide a device for connecting an air screw with a drive shaft which has a plurality of torque-transmitting rubber bushings.

A still further object of the invention is to provide a propeller joint having a plurality of rubber bushings disposed symmetrically around an end of a propeller mounting.

Other and further objects of the invention will be apparent to those skilled in the art from the following detailed description of the annexed sheets of drawings which, by way of preferred example, illustrate one embodiment of the invention.

On the drawings:

Figure 1 is an end elevational view of a propeller joint acording to this invention.

Figure 2 is a transverse, cross-sectional view, with parts in elevation, taken along the line II—II of Figure 1.

Figure 3 is an enlarged axial cross-sectional view, with parts in elevation, taken along the line III—III of Figure 1.

As shown on the drawings:

In Figures 1 to 3 the reference numeral 10 designates generally a propeller joint coupling an aircraft engine drive shaft with the hub 12 of a propeller as best shown in Figure 3.

The shaft 11 has a shoulder 11a inwardly from the end thereof, a reduced-diameter cylindrical portion 11b extending from the shoulder 11a, a splined intermediate portion 11c on the reduced-diameter cylindrical portion 11b, and a threaded end portion 11d.

A sleeve 13 is mounted on the shaft 11 and has a splined intermediate portion 13a splined to the portion 11c of the shaft together with a recessed end portion 13b receiving the cylindrical portion 11b of the shaft, and a second recessed end portion 13c on the other end thereof receiving the threaded end portion 11d of the shaft.

The sleeve 13 also has a cylindrical external portion 13d which is threaded at the end thereof as at 13e. A second cylindrical portion 13f is provided at the other end of the sleeve of larger diameter than the portion 13d and a tapered thrust face 13g is formed at the inner end of the cylindrical portion 13f.

A wedge ring 14 is bottomed on the shoulder 11a of the shaft, and seats on the tapered side wall of the recessed end 13b of the sleeve 13. A multi-piece wedge ring 15 is disposed around the portion 11d of the shaft and is seated on a tapered wall of the recessed end 13c of the sleeve 13. This multi-piece wedge ring 15 has a thrust face 15a inwardly from the end thereof surrounded by a skirt 15b with an inturned flange 15c on the end thereof. A nut 16 is threaded on the portion 11d of the shaft and has an outturned flange or rim 16a in interfitting relation with the flange 15c. The nut 16 acts on the thrust face 15a of the wedge ring 15 to force the wedge ring 15 toward the ring 14 and thereby secure the sleeve 13 to the shaft 11. Reverse rotation of the nut will cause the flange or rim 16a to engage the flange or rim 15c and loosen the wedge ring 15 from the recessed end 13b of the sleeve.

The recessed end portion 13c of the sleeve 13 has a groove therein receiving a snap lock ring R adapted to abut the flange 15c of the multi-piece wedge ring 15 to prevent unauthorized removal of the nut 16 and wedge ring 15. When desired, the ring R can be removed from the sleeve 13.

A propeller hub-carrying sleeve member 17 is disposed around the sleeve 13 and has a tapered face 17a cooperating with the thrust face 13g of the sleeve. A bearing 18 of bronze or other suitable material is disposed between the faces 17a and 13g. The sleeve 17 also has a tapered face 17b cooperating with a thrust ring 19 which is slidably mounted on the cylindrical portion 13d of the sleeve 13. This thrust ring 19 is urged against a bronze or other suitable bearing 20 on the face 17b by means of a nut 21 threaded on the portion 13e of the sleeve 13. The threaded portion 13e contains a key slot 22 and a washer 23 is interposed between the nut 21 and the ring 19. This washer 23 has a key or tang portion 23a projecting in the slot 22.

The nut 21 is castellated around the periphery thereof and a portion 23b of the washer 23 is bent down into one of the grooves 21a of the castellated nut so as to lock the nut 21 on the sleeve 13.

The sleeve 13 has a groove 19a therearound receiving a gasket or seal ring 24 for acting on the sleeve 17 to seal the space between the sleeves 17 and 13. A groove 25 is also provided in the sleeve 13 at the other end portion thereof to receive a similar gasket or sealing ring 26 for acting on the sleeve 17.

The sleeve 17 has an outturned flange 17c at one end thereof. The propeller hub 12 is disposed around the sleeve 17 and bottomed on the flange 17c. A plate 27 surrounds the sleeve 17 and overlies the propeller hub 12. Bolts such as 28 are passed through the plate 27, propeller hub 12 and flange 17c to secure the propeller hub to the sleeve 17.

A ring 29 is bolted to the recessed end 13c of the sleeve 13 and has a plurality of upstanding legs 29a spaced equally around the periphery thereof. Each leg 29a carries a radially extending pin 30 on which is mounted a trunnion block 31 seated in the wire or fabric-lined bore 32a of a rubber bushing 32.

The bushing 32 has a circular periphery vulcanized in a metal sleeve 33 which is seated in a casing 34. Each casing 34 is surrounded by a split annular housing or strap 35 having the split segments thereof contractable by means of a bolt 36 to retain the casing 34 within the housing. These housings 35 are formed on a ring 38 which is bolted to the flange 17c of the sleeve 17.

While three housings 35 are shown on the ring 38, it should be understood that any number of housings could be used to cooperate through the rubber bushings with a similar number of legs and pins on the other ring member 29.

The housings 35 can, if desired, be in the form of continuous annular members and need not be split and contractable as shown. If continuous annular housings are used, the casings 34 can be eliminated and the sleeves 33 of the bushings 32 press-fitted into the housings.

Also, if desired, the pins 30 can be in the form of thin-headed bolts with the bolt heads bottomed on the bosses of the legs 29a.

From the above descriptions it will be understood that the torque load from the drive shaft 11 is transmitted through the sleeve 13 to the ring 29 and thence through the rubber bushings 32 to the ring 38 and sleeve 17 for driving the propeller hub 12 mounted on the sleeve 17.

The end faces of the rubber bushings 32 are exposed and the rubber of these bushings can be deformed to accommodate slight relative movement between the propeller hub and the drive shaft, but such movement is resisted by interparticle flow of the rubber, tending to dampen out any vibrations. The bushings are disposed radially around the drive shaft and transmit torque loads from the drive shaft to the propeller hub. A resilient coupling between the drive shaft and the propeller hub is thus provided. This coupling is readily removable from the propeller assembly by removal of the bolts which attach the rings 29 and 38 to the assembly.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A device for coupling a drive shaft with a propeller hub which comprises a sleeve having an internally splined intermediate portion and recessed end portions with tapered side walls converging toward said intermediate portion, a drive shaft projecting into said sleeve having a shoulder adjacent one recessed end portion of the sleeve together with a splined portion secured to the splined intermediate portion of the sleeve and a threaded portion adjacent the other recessed end portion of the sleeve, a wedge ring bottomed on said shoulder seated on the tapered side wall of said one recessed end portion of the sleeve, a multi-piece wedge ring seated on the tapered side wall of the other recessed end portion of the sleeve, said multi-piece wedge ring having an abutment face, a nut threaded on said shaft thrusting against the abutment face of the multi-piece wedge ring, said nut and said multi-piece wedge ring having interfitting flanges adapted to pull the multi-piece wedge ring out of the recessed end portion of the sleeve when the nut is loosened on the shaft, said sleeve having an external tapered thrust face at the end thereof receiving the multi-piece wedge ring, a ring slidable on the other end of said sleeve having a tapered thrust face, a propeller hub-receiving member surrounding said sleeve having opposed thrust faces cooperating with said thrust faces on the sleeve, a nut threaded on the sleeve to act on the ring with the tapered thrust face for seating said member between the thrust faces on the sleeve, a coupling ring secured on said sleeve, a second coupling ring secured on said member, and means including rubber bushings operatively connecting said coupling rings for coupling the sleeve and member.

2. A device for coupling a drive shaft with a propeller hub which comprises a sleeve adapted to be mounted on a drive shaft, arms projecting from said sleeve, pins extending radially from said arms, a propeller hub-receiving member, bushing housings carried by said member, and resilient bushings in said housing connecting said member with said sleeve through said pins.

3. A device for connecting a drive shaft with a propeller which comprises an inner sleeve adapted to receive a drive shaft, an outer sleeve adapted to receive a propeller hub, cooperating tapered thrust faces on said sleeves to center the outer sleeve on the inner sleeve, inner and outer rings secured to adjacent end faces of said sleeves, housings on the outer ring, upstanding legs on the inner ring, pins carried by said legs, rubber bushings carried by said housings, and trunnion blocks in said rubber bushings receiving said pins to couple the inner and outer sleeve through said rubber bushings.

4. A coupling comprising nested sleeves, axial projections on adjoining end faces of the sleeves, radial extensions on the projections of one sleeve, and independent resilient blocks carried by the projections of the other sleeve receiving said extensions to couple the sleeves.

5. A propeller joint comprising an internally splined sleeve adapted to receive a splined drive shaft, a flanged sleeve disposed around said splined sleeve, cooperating thrust faces on said sleeves, a ring slidable on said splined sleeve, a nut threaded on said splined sleeve acting on said ring to urge the ring toward said thrust faces, a propeller hub on said flanged sleeve bottomed on the flange thereof, hub-securing studs carried by said flange, rubber bushings carried at spaced intervals around said flange, and means carried by said splined sleeve seated in said bushings for drivingly connecting said sleeves through said bushings.

JAMES H. BOOTH.